United States Patent
Blewett et al.

(10) Patent No.: US 8,395,275 B2
(45) Date of Patent: Mar. 12, 2013

(54) INTEGRATED PERMANENT MAGNET ALTERNATOR AND COOLING FAN

(75) Inventors: Michael R. Blewett, Stillman Valley, IL (US); Harold W. Hipsky, Willington, CT (US); Gerald P. Dyer, Enfield, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 371 days.

(21) Appl. No.: 12/942,527

(22) Filed: Nov. 9, 2010

(65) Prior Publication Data

US 2012/0112575 A1 May 10, 2012

(51) Int. Cl.
*F01D 15/10* (2006.01)
(52) U.S. Cl. .......................................... 290/52
(58) Field of Classification Search ............... 290/52; 60/788
See application file for complete search history.

(56) References Cited

U.S. PATENT DOCUMENTS

| | | | |
|---|---|---|---|
| 4,151,710 A | 5/1979 | Griffin et al. | |
| 4,474,001 A | 10/1984 | Griffin et al. | |
| 5,189,620 A | 2/1993 | Parsons et al. | |
| 7,057,315 B2 | 6/2006 | Ishida et al. | |
| 7,775,044 B2 * | 8/2010 | Julien et al. | 60/614 |
| 7,997,082 B2 * | 8/2011 | Beardsley | 60/772 |
| 8,146,370 B2 * | 4/2012 | Zeiner et al. | 60/792 |
| 2005/0229602 A1 | 10/2005 | Whiting | |
| 2009/0271086 A1 | 10/2009 | Morris et al. | |
| 2011/0030385 A1 * | 2/2011 | Ellans et al. | 60/786 |
| 2012/0111022 A1 * | 5/2012 | Dyer | 60/788 |

FOREIGN PATENT DOCUMENTS

| | | |
|---|---|---|
| EP | 0943069 A1 | 9/1999 |
| EP | 1612371 A1 | 1/2006 |
| WO | 0237046 A2 | 5/2002 |

OTHER PUBLICATIONS

Extended European Search Report of the European Patent Office dated May 21, 2012, in counterpart Application No. 11189820.1.

* cited by examiner

*Primary Examiner* — Tho D Ta
(74) *Attorney, Agent, or Firm* — Kinney & Lange, P.A.

(57) ABSTRACT

A permanent magnet alternator includes a permanent magnet alternator stator attached to a housing. A shaft is rotatable with respect to the housing with a permanent magnet alternator rotor attached to the shaft. The permanent magnet alternator rotor is positioned with respect to the permanent magnet alternator stator so as to generate electricity when the shaft rotates. A cooling fan is also attached to the shaft and is positioned in a gas flow path for flowing air through the gas flow path.

16 Claims, 3 Drawing Sheets

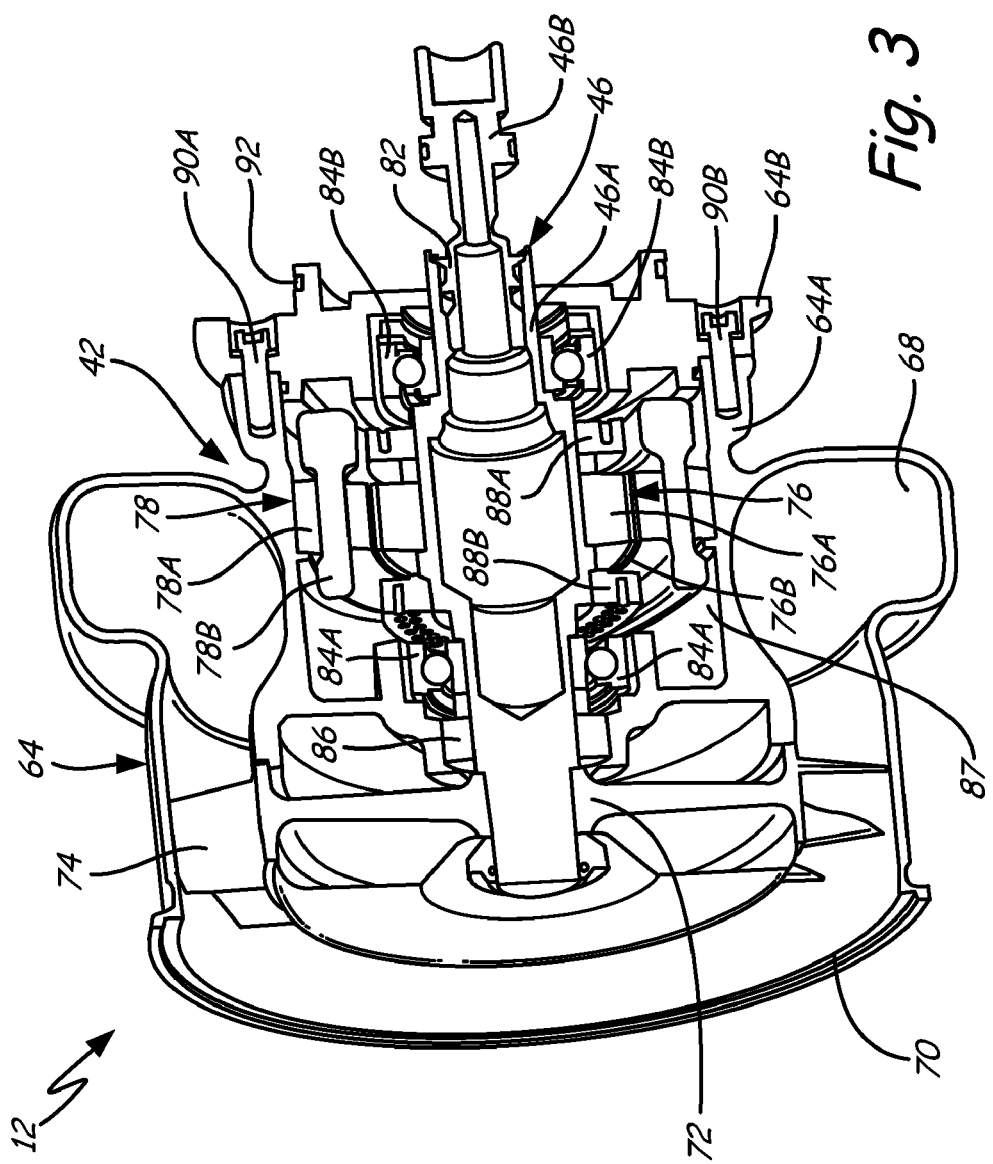

INTEGRATED PERMANENT MAGNET ALTERNATOR AND COOLING FAN

BACKGROUND

The present invention relates to gas turbine engines, and in particular, to alternators on gas turbine engines. Gas turbine engines typically have at least one spool that includes a compressor and a turbine. An accessory gearbox is often connected to the spool, and provides gearing to connect the spool to various accessories, such as alternators, pumps, and engine starters, for example. Each accessory is typically connected directly to the gearbox. Thus, as more accessories are added to the gearbox, the size and weight of the gearbox can become undesirably large and heavy. This can be particularly undesirable in applications where space is a premium and weight is undesirable, such as with a gas turbine engine used on an aircraft.

Some gas turbine engines have a relatively small permanent magnet alternator (PMA) attached to the gearbox and driven by the spool. Such an alternator typically supplies electric power either primarily or exclusively to an engine controller. One or more larger generators typically power other systems on the aircraft. These permanent magnet alternators allow for an engine controller to have a relatively reliable supply of power whenever the spool is rotating, but also occupy valuable space on the accessory gearbox.

Gas turbine engines also typically have various components, such as gears and bearings, which benefit from lubrication and cooling. An oil supply system supplies oil, or another lubricating liquid, to and from the components to lubricate and cool the components. A typical method of cooling engine oil is by utilizing an air-to-oil heat exchanger. A common source of air for a heat sink is bypass flow from an engine propulsion fan. If the bypass flow is relatively slow, the heat exchanger typically needs to be relatively large and bulky to achieve the desired amount of cooling. A relatively large heat exchanger undesirably increases the weight of an aircraft. In gas turbine engines where the heat exchanger is positioned in a bypass flow stream of the engine's propulsion fan, the heat exchanger can also reduce overall thrust output.

SUMMARY

According to the present invention, a permanent magnet alternator includes a permanent magnet alternator stator attached to a housing. A shaft is rotatable with respect to the housing with a permanent magnet alternator rotor attached to the shaft. The permanent magnet alternator rotor is positioned with respect to the permanent magnet alternator stator so as to generate electricity when the shaft rotates. A cooling fan is also attached to the shaft and is positioned in a gas flow path for flowing air through the gas flow path.

Another embodiment of the present invention includes a method of generating electrical power and cooling lubricating liquid on a gas turbine engine. The method includes rotating an alternator shaft driven by a spool of a gas turbine engine and generating electrical power via an alternator having a rotor connected to the alternator shaft. The method also includes flowing air through a gas flow path via a cooling fan attached to the shaft and cooling lubricating liquid via a heat exchanger positioned in the gas flow path.

BRIEF DESCRIPTION OF THE DRAWINGS

FIG. 3 is a perspective cross sectional view of the integrated permanent magnet alternator and cooling fan system of FIG. 1.

DETAILED DESCRIPTION

Figure 1:
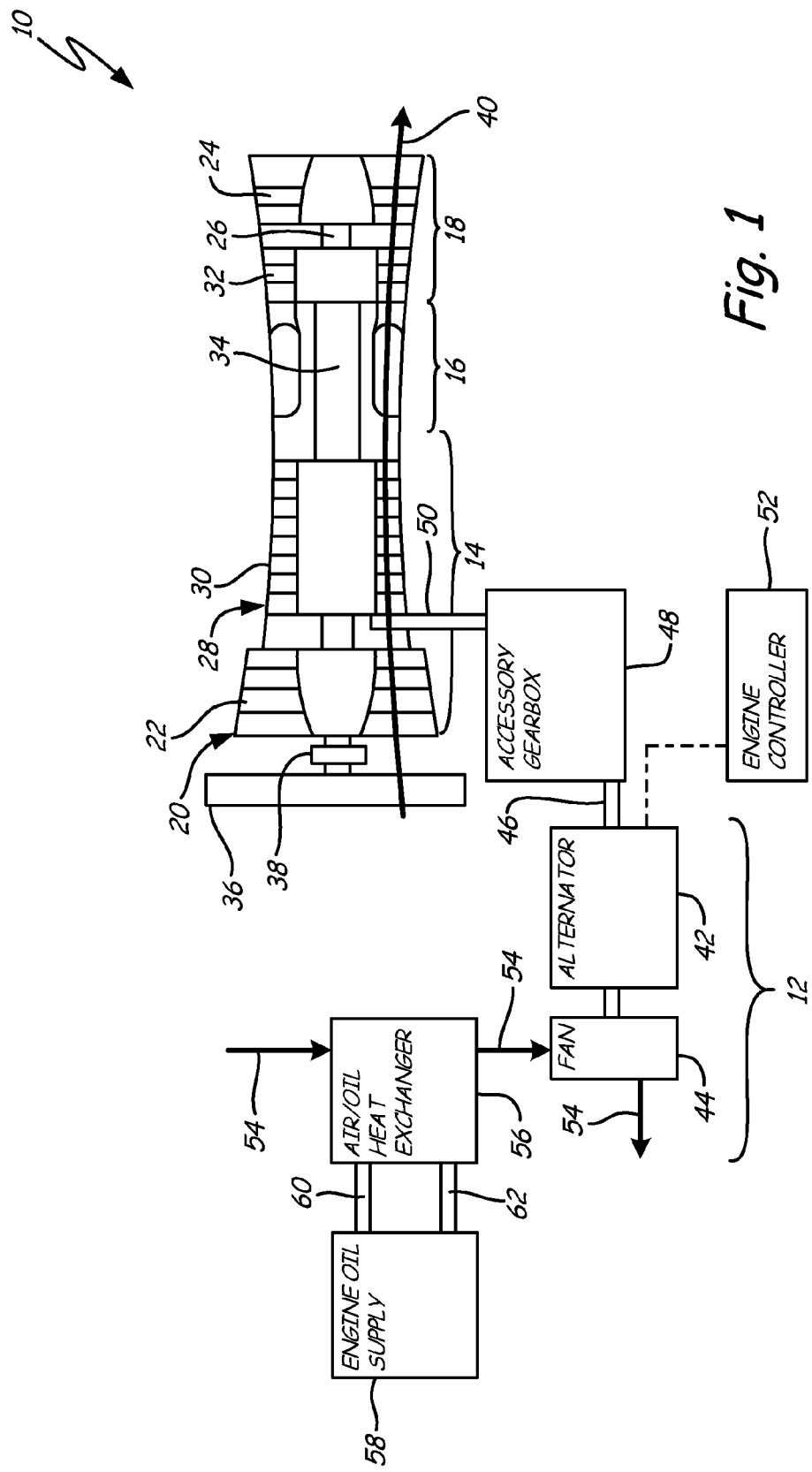
FIG. 1 is a schematic view of a gas turbine engine having an integrated permanent magnet alternator and cooling fan system.

FIG. 1 is a schematic view of gas turbine engine 10 having integrated permanent magnet alternator (PMA) and cooling fan system 12 (integrated system 12). Gas turbine engine 10 includes main compressor section 14, main combustor section 16, and main turbine section 18. Low pressure spool 20 (which includes low pressure compressor 22 and low pressure turbine 24 connected by low pressure shaft 26) and high pressure spool 28 (which includes high pressure compressor 30 and high pressure turbine 32 connected by high pressure shaft 34) each extend from main compressor section 14 to main turbine section 18. Propulsion fan 36 is connected to and driven by low pressure spool 20. A fan drive gear system 38 may be included between the propulsion fan 36 and low pressure spool 20. Air flows from main compressor section 14 to main turbine section 18 along engine gas flow path 40. The general construction and operation of gas turbine engines is well-known in the art, and therefore detailed discussion here is unnecessary.

Integrated system 12 includes alternator 42 and cooling fan 44, both connected to shaft 46. Thus, shaft 46 is both an alternator shaft and a fan shaft. Accessory gearbox 48 is connected to integrated system 12 by shaft 46 and to high pressure spool 28 by shaft 50. In operation, shaft 50, shaft 46, alternator 42, and cooling fan 44 all rotate when high pressure spool 28 rotates. When shaft 46 rotates, alternator 42 generates electric power, which is supplied to engine controller 52. Engine controller 52 controls operation of gas turbine engine 10. Because alternator 42 generates power whenever high pressure spool 28 rotates, engine controller 52 can have a relatively reliable supply of electric power substantially whenever gas turbine engine 10 is operating. Alternator 42 can be dedicated to power only components on gas turbine engine 10. In the illustrated embodiment, alternator 42 powers only engine controller 52. By limiting the components which alternator 42 is used to power, alternator 42 can be a relatively small permanent magnet alternator.

Also when shaft 46 rotates, cooling fan 44 creates a pressure rise in cooling fan gas flow path 54. In the illustrated embodiment, cooling fan 44 is positioned downstream of heat exchanger 56 along cooling fan gas flow path 54. Thus, cooling fan 44 provides suction to draw a gas, such as air, over heat exchanger 56 when cooling fan 44 rotates. In alternative embodiments, cooling fan 44 can be positioned upstream of heat exchanger 56.

Heat exchanger 56 is fluidically connected to engine oil supply 58 by supply line 60 and return line 62. Heat exchanger 56 receives warm oil from engine oil supply 58 along supply line 60, and returns cool oil to engine oil supply 58 along return line 62. Engine oil supply 58 supplies oil to and scavenges oil from various gears, bearings, and other components of gas turbine engine 10, including accessory gearbox 48 and optionally, fan drive gear system 38.

Thus, integrated system 12 can be used both to generate electrical power for engine controller 52 and to cool oil used in gas turbine engine 10.

Figure 2:
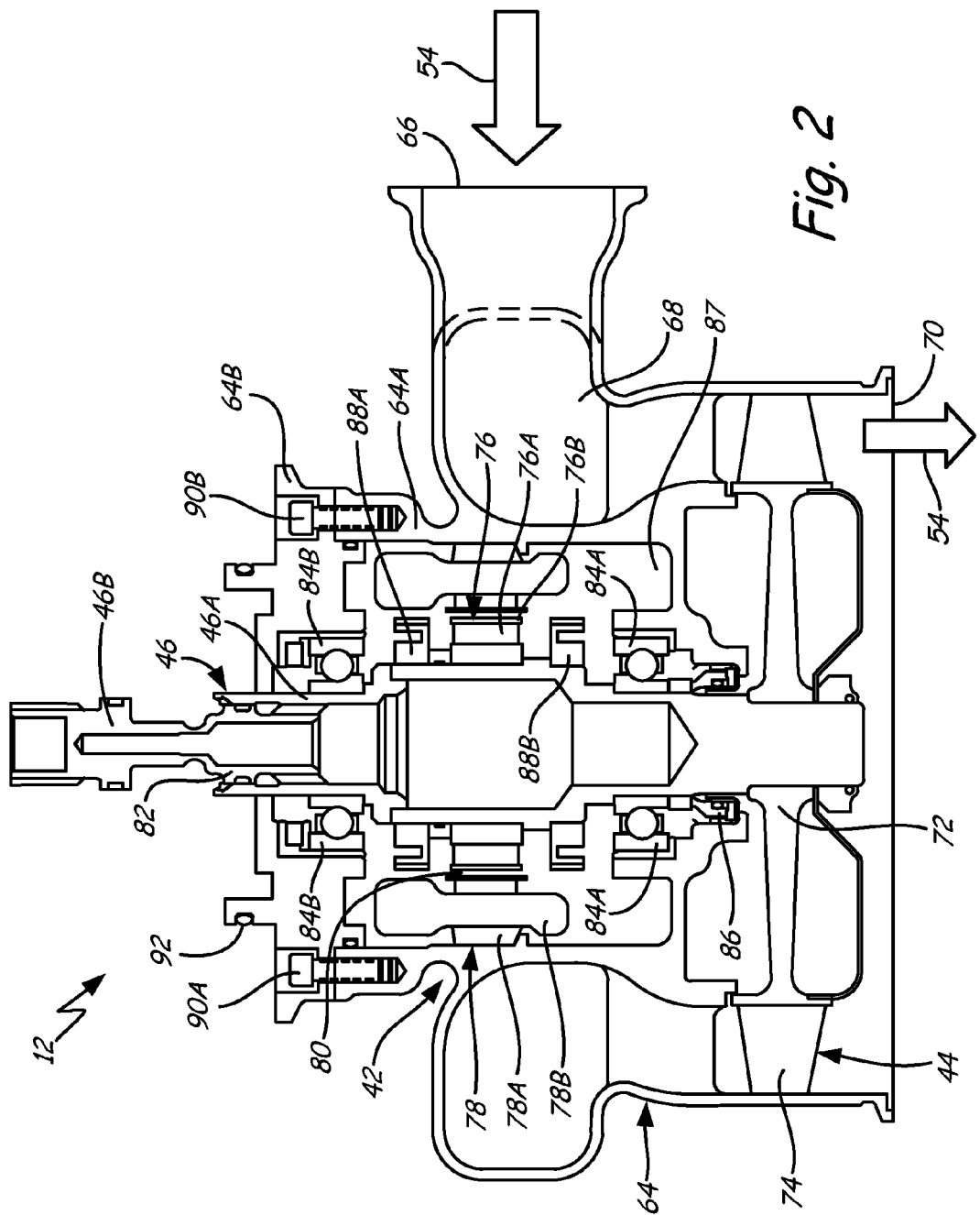
FIG. 2 is side view of the integrated permanent magnet alternator and cooling fan system of FIG. 1.

FIG. 2 is a side view of integrated system 12. Alternator 42 and cooling fan 44 are both positioned substantially inside housing 64. Thus, housing 64 is both an alternator housing and a fan housing. Housing 64 also defines a portion of cooling fan gas flow path 54, and includes fan inlet 66, plenum 68, and fan outlet 70. Cooling fan 44 draws air from heat exchanger 56 (shown in FIG. 1) through fan inlet 66 into plenum 68 and then blows that air through fan outlet 70.

Cooling fan 44 includes hub 72 connected to shaft 46 and fan blades 74 connected to and extending substantially radially outward from hub 72. Fan blades 74 are positioned in cooling fan gas flow path 54. In the illustrated embodiment, fan 54 is an axial flow fan. In other embodiments, cooling fan 54 can be another type of fan, such as a radial flow fan, suitable for speed and flow requirements of a particular application.

Alternator 42 includes permanent magnet alternator (PMA) rotor 76 attached to fan shaft 46 and includes PMA stator 78 attached to housing 64. PMA rotor 76 includes rotor magnets 76A and rotor containment band 76B. PMA stator 78 includes stator laminations 78A and stator windings 78B. Air gap 80 spaces PMA rotor 76 from PMA stator 78. PMA rotor 76 is positioned with respect to PMA stator 78 so as to generate electricity when shaft 46 rotates. Fan inlet 66 and plenum 68 of cooling fan gas flow path 54 are positioned radially outward from both PMA rotor 76 and PMA stator 78. Fan outlet 70 is positioned substantially radially outward from both PMA rotor 76 and PMA stator 78.

Shaft 46 is positioned partially inside and rotatable with respect to housing 64. In the illustrated embodiment, shaft 46 includes main shaft 46A connected to input shaft 46B at splined coupling 82. Shaft 46 is supported with respect to housing 64 via bearings 84A and 84B. Shaft seal 86 is positioned between shaft 46 and housing 64 and between cooling fan 44 and alternator 42. Shaft seal 86 allows shaft 46 to rotate with respect to housing 64 while restricting airflow between cooling fan 44 and internal cavity 87 of alternator 42. Balancing rings 88A and 88B are positioned on shaft 46 on each side of PMA rotor 76. Input shaft 46B extends into and is connected to gearing of accessory gearbox 48 (shown in FIG. 1).

In the illustrated embodiment, housing 64 includes housing main portion 64A and housing input cover 64B. Housing input cover 64B is connected to housing main portion 64A via bolts 90A and 90B. Housing input cover 64B connects housing 64 to accessory gearbox 48. Housing input cover 64B includes seal ring 92 for sealing its connection to accessory gearbox 48.

Because cooling fan 44 and PMA rotor 76 are both mounted on the same shaft 46, cooling fan 44 and PMA rotor 76 will rotate at the same speed. Thus, cooling fan 44 and alternator 42 can both operate relatively efficiently at the same time if cooling fan 44 and alternator 42 are designed and sized to operate over a common operating speed range. In the illustrated embodiment, both cooling fan 44 and alternator 42 are sized and designed to operate between about 20,000 revolutions per minute (rpm) and about 34,000 rpm. Such speeds are suitable for alternator 42 to provide sufficient power to engine controller 52 and for cooling fan 44 to draw a sufficient amount of air over heat exchanger 56. This allows heat exchanger 56 to be relatively small and light weight as compared to a heat exchanger without the assistance of cooling fan 44. In alternative embodiments, cooling fan 44 and alternator 42 can be sized and designed for other operating speeds so long as those speeds are suitable for their application.

FIG. 3 is perspective cross sectional view of one embodiment of integrated system 12. As illustrated in FIG. 3, fan inlet 66 (shown in FIG. 2) is hidden behind housing 64. Plenum 68 is shown to have a substantially torus shape with a hollow interior for holding air prior to that air flowing through cooling fan 44.

Thus, integrated system 12 can be used not only to power engine controller 52 but also to cool oil in engine oil supply 58 of gas turbine engine 10. By attaching cooling fan 44 to shaft 46 along with alternator 42, cooling fan 44 can be driven by high pressure spool 28 through accessory gearbox 48 without having to attach cooling fan 44 to its own gear center location on accessory gearbox 48. This allows accessory gearbox 48 to be relatively small. By using cooling fan 44 to increase air flow through heat exchanger 56, heat exchanger 56 can be relatively small, while still providing the same amount of cooling as that of a larger heat exchanger having less air flow. Having a relatively small heat exchanger 56 and accessory gearbox 48 allows the overall weight of gas turbine engine 10 to be relatively small. Using cooling fan 44 to draw air through heat exchanger 56 also allows for heat exchanger 56 to be positioned in locations other than in a bypass flow stream of propulsion fan 36, thus increasing the effective thrust of propulsion fan 36. Combining alternator 42 and cooling fan 44 together allows for electrical power production and oil cooling to be performed by one relatively simple, small, and light-weight system.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the appended claims. For example, cooling fan gas flow path 54 need not be shaped precisely as illustrated, so long as alternator 42 and cooling fan 44 are both suitably connected to shaft 46 as part of integrated system 12.

The invention claimed is:

1. A gas turbine engine comprising:
    a heat exchanger positioned in a gas flow path and fluidically connected to the gas turbine engine for cooling lubricating liquid used by the gas turbine engine;
    a high pressure spool; and
    an alternator including:
        a shaft connected to gearing driven by the high pressure spool;
        a housing defining a portion of the gas flow path;
        an alternator stator attached to the housing;
        an alternator rotor mounted on the shaft and positioned with respect to the alternator stator so as to generate electricity when the shaft rotates; and
        a cooling fan mounted on the shaft and positioned in the gas flow path for flowing air over the heat exchanger.

2. The gas turbine engine of claim 1, wherein the heat exchanger is positioned in the gas flow path upstream of the cooling fan.

3. The gas turbine engine of claim 1, and further comprising:
    an engine controller electrically connected to and powered by the alternator.

4. The gas turbine engine of claim 3, wherein the alternator powers only the engine controller.

5. The gas turbine engine of claim 1, wherein the gas flow path is positioned substantially radially outward from the alternator stator.

6. The gas turbine engine of claim 1, wherein the cooling fan is an axial flow fan.

7. A permanent magnet alternator for powering a gas turbine engine controller, the permanent magnet alternator comprising:
- a housing defining a portion of a gas flow path;
- a permanent magnet alternator stator attached to the housing;
- a shaft rotatable with respect to the housing;
- a permanent magnet alternator rotor mounted on the shaft and positioned with respect to the permanent magnet alternator stator so as to generate electricity when the shaft rotates; and
- a cooling fan mounted on the shaft and having fan blades positioned in the gas flow path for flowing air through the gas flow path.

8. The permanent magnet alternator of claim 7, wherein the gas flow path positioned is substantially radially outward from the permanent magnet alternator stator.

9. The permanent magnet alternator of claim 7, wherein the cooling fan is an axial flow fan.

10. A method of generating electrical power and cooling lubricating liquid on a gas turbine engine, the method comprising:
- providing a housing defining a portion of a gas flow path;
- rotating an alternator shaft via gearing driven by a spool of a gas turbine engine;
- generating electrical power via an alternator having a rotor connected to the alternator shaft and a stator attached to the housing;
- flowing air through the gas flow path via a cooling fan attached to the alternator shaft; and
- cooling lubricating liquid via a heat exchanger positioned in the gas flow path.

11. The method of claim 10, and further comprising:
- flowing warm lubricating liquid from components of the gas turbine engine to the heat exchanger; and
- flowing cooled lubricating liquid from the heat exchanger to components of the gas turbine engine.

12. The method of claim 10, wherein the shaft rotates between about 20,000 revolutions per minute and 34,000 revolutions per minute.

13. The method of claim 10, wherein the cooling fan draws air through the heat exchanger.

14. The method of claim 10, and further comprising:
- powering an engine controller via the alternator.

15. The method of claim 14, wherein the alternator powers only components on the gas turbine engine.

16. The method of claim 14, wherein the alternator powers only the engine controller.

* * * * *